US007185943B2

(12) United States Patent
Lesle et al.

(10) Patent No.: US 7,185,943 B2
(45) Date of Patent: Mar. 6, 2007

(54) TWO PIECE SLIDING WINDOW PANEL HAVING LEAD SCREW POWER UNIT

(75) Inventors: Michael James Lesle, Toledo, OH (US); Daryl Wilson, Ypsilanti, MI (US); Ioana Mihailescu, Canton, MI (US)

(73) Assignees: Automotive Components Holdings, LLC, Dearborn, MI (US); Dana Corporation, Toledo, OH (US)

( * ) Notice: Subject to any disclaimer, the term of this patent is extended or adjusted under 35 U.S.C. 154(b) by 152 days.

(21) Appl. No.: 10/966,244

(22) Filed: Oct. 15, 2004

(65) Prior Publication Data

US 2006/0080893 A1 Apr. 20, 2006

(51) Int. Cl.
*B60J 1/00* (2006.01)

(52) U.S. Cl. ............................ 296/146.16; 296/190.1; 49/413

(58) Field of Classification Search ............ 296/190.1, 296/146.15, 146.16; 49/413, 352, 34
See application file for complete search history.

(56) References Cited

U.S. PATENT DOCUMENTS

| | | | | |
|---|---|---|---|---|
| 4,346,648 | A * | 8/1982 | Chatlos | 296/146.15 |
| 5,192,112 | A * | 3/1993 | Gherardi et al. | 296/190.1 |
| 5,644,869 | A * | 7/1997 | Buchanan, Jr. | 49/362 |
| 6,260,905 | B1 * | 7/2001 | Wagner | 296/146.16 |
| 6,286,891 | B1 * | 9/2001 | Gage et al. | 296/146.15 |
| 6,756,707 | B2 * | 6/2004 | Hochhalter et al. | 310/20 |
| 7,025,405 | B2 * | 4/2006 | Gillen | 296/146.16 |
| 2003/0089043 | A1 * | 5/2003 | Oberheide | 49/413 |
| 2005/0073172 | A1 * | 4/2005 | Weinert et al. | 296/146.16 |

* cited by examiner

*Primary Examiner*—Lori L. Coletta

(57) ABSTRACT

A sliding window panel assembly for a motor vehicle. The assembly includes a stationary window panel having an opening formed therein, at least one guide rail coupled to the stationary window panel below the opening and above a bottom edge of the stationary window panel, a shoe slidably received within the guide rail and configured to slidably move within the guide rail, a movable window panel mounted onto the shoe such that the movable window panel slidably moves with the shoe. The movable window panel can slidably move with respect to the stationary panel along a movable panel path. The lead screw drive unit engages the shoe and is adapted to move the shoe and the movable panel along the movable panel path within the guide rail.

21 Claims, 5 Drawing Sheets

TWO PIECE SLIDING WINDOW PANEL HAVING LEAD SCREW POWER UNIT

BACKGROUND

1. Field of the Invention

This invention generally relates to a sliding window panel assembly. More specifically, the invention relates to a two-piece sliding window panel assembly having a lead screw power unit incorporated therein.

2. Related Technology

Automobiles, particularly pick-up trucks, often have sliding window assemblies (backlight windows) to control the automobile passengers' exposure to ambient air and to allow access to the cargo box of the pick-up truck. These window assemblies often comprises two, three, or four piece encapsulated units.

Further, these units are sometimes power enabled with a remotely mounted motor and push-pull or pull-pull cables to allow the window to be power opened and closed. Due to the nature of the pull-pull or push-pull cable systems, the power system takes up a large amount of space and introduces maintenance and durability problems. Therefore, it would be advantageous to develop a power unit that is less complex and smaller than traditional cable systems.

In automotive applications incorporating a two piece sliding window panel assembly, the assemblies typically include a stationary window having an opening and a movable window that is movable between a "closed position" and an "open position." In the closed position, the movable window covers the opening of the stationary window and prevents airflow through the sliding window panel assembly. In the open position, the movable window fails to cover at least some portion of the opening and permits airflow through the sliding window assembly.

As with all manufacturing, it is advantageous to include features that improve installation, quality, and cost. Means that readily and properly allow an operator to power open and close a sliding window panel assembly would therefore be advantageous.

All of the above limitations present problems in construction, manufacturing, and installation of sliding window assemblies, such as those found in the rear windows of pick-up trucks.

SUMMARY

In overcoming the disadvantages and drawbacks of the known technology, the current invention provides a sliding window assembly having powered movement of the sliding window, while at the same time limiting the complexity and size of the assembly. The sliding window assembly is provided with a stationary window having portions defining an opening, at least one movable window being selectively movable between a position covering the opening (the closed position) and a position uncovering the opening (the open position), at least one guide rail attached to the stationary window above a bottom edge of the stationary window, and a lead screw unit mounted to the stationary window to move the movable window between the open and closed positions. The movable window is adjustable between the open position and the closed position in order to control the airflow through the opening defined by the stationary window. The sliding window assembly may also include a latch mechanism to lock the movable window in a closed position.

The lead screw unit includes a lead screw positioned within and parallel to the guide rail and a drive unit that rotates the lead screw in either a clockwise or counter-clockwise direction. A shoe includes a lead screw follower that engages the lead screw such that rotation of the lead screw causes movement of the lead screw follower longitudinally along the lead screw, thereby moving the shoe and the movable panel within the guide rail.

In one aspect, the guide rail is mounted to the stationary panel parallel to the bottom edge of the stationary panel, such that the movable panel slides parallel to the bottom edge of the stationary panel. In another aspect, the guide rail is mounted to the stationary panel at an angle relative to the bottom edge of the stationary panel and the movable panel is mounted onto the shoe at an angle relative to the bottom edge of the stationary panel. In yet another aspect, the lead screw assembly includes a reduction unit positioned between the drive unit and the lead screw. The reduction unit can comprise a pair of gears interconnected by a third gear, a pair of gears interconnected by a belt, or a pair of pulleys interconnected by a belt. Rotation of the drive unit is transferred to the lead screw through the reduction unit.

DETAILED DESCRIPTION OF THE INVENTION

Figure 1:
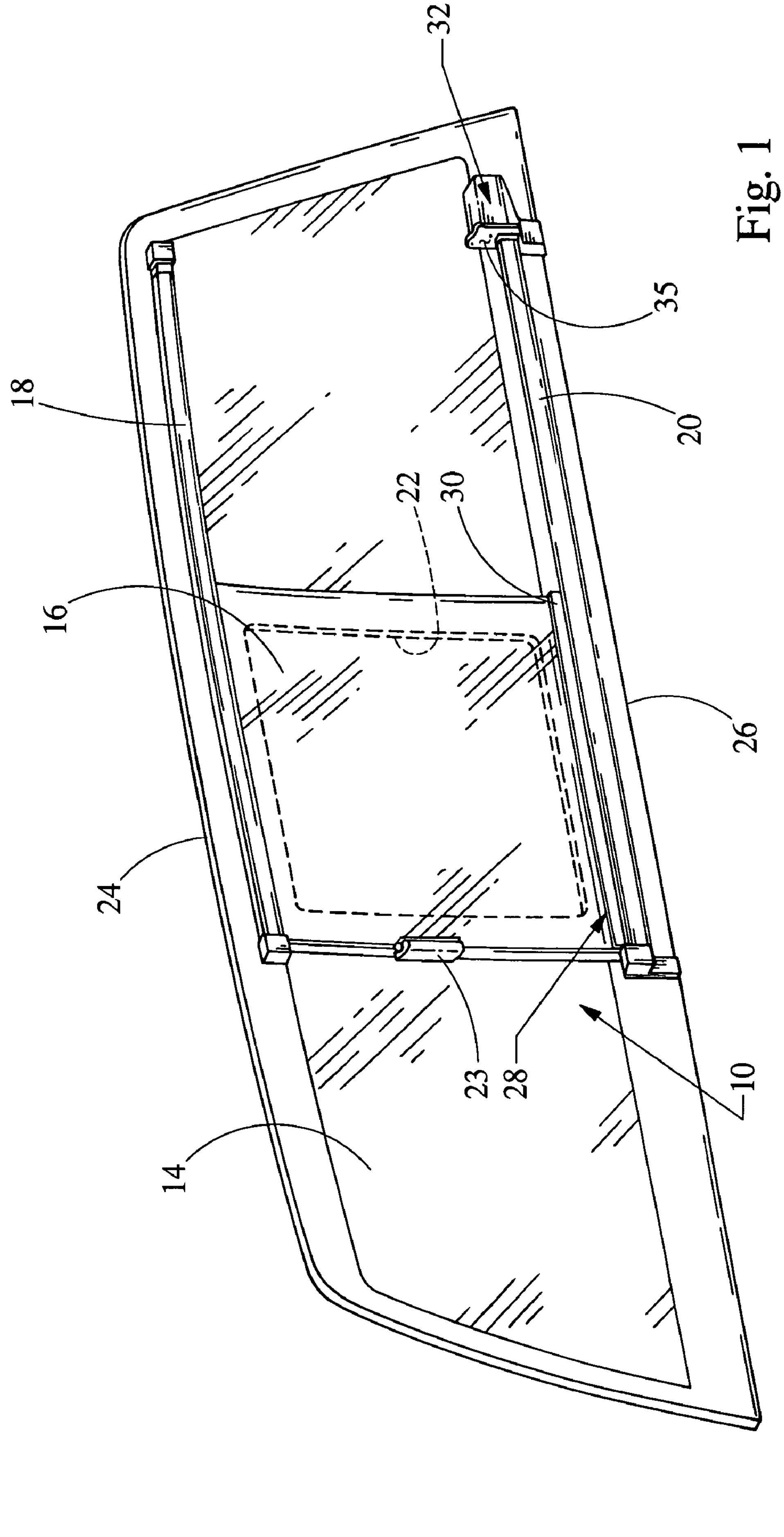
FIG. 1 is a perspective view of a sliding window assembly embodying the principles of the present invention.

FIG. 1 shows a sliding window assembly 10 for a motor vehicle 12 according to an embodiment of the present invention, as viewed from the interior of the motor vehicle 12. The window assembly 10 includes, as its primary components, a stationary window 14, a movable window 16, and guide rails 18, 20 that permit translational movement of the movable window 16 with respect to the stationary window 14.

The stationary window 14 has an opening 22 formed centrally therein that provides access into and out of the interior cabin of the motor vehicle 12. The movable window 16 slides within the rails 18, 20 to either completely cover, partially cover, or fully un-cover the opening 22. In one embodiment, the movable window 14 includes a latching mechanism 23 to lock the movable window 16 and the stationary window 14 together. The latching mechanism 23 is preferably constructed of glass reinforced nylon, plastic, or a polycarbonate material (such as lexan).

The guide rails 18, 20 are mounted onto the stationary window 14. The top guide rail 18 is mounted onto the stationary window 14 above the opening 22 and below a top edge 24 of the stationary window. Similarly, the bottom guide rail 20 is mounted to the stationary window 14 below the opening 22 and above a bottom edge 26 of the stationary window 14. Each of the guide rails 18, 20 is configured to permit the movable window 16 to move laterally (parallel with the guide rails 18, 20) but not transversely (perpendicular to the guide rails 18, 20). If the movable window 16 is located within a frame (not shown), the guide rails 18, 20 preferably slidably receive the frame as well. The guide rails 18, 20 are preferably composed of polypropylene, anodized aluminum, or other appropriate materials, and are mounted to the stationary window 14 by an adhesive (not shown). The adhesive may be any adhesive material commonly used for mounting to a glass surface. One such material is Scotch(D permanent double-sided tape, but other appropriate materials may be used. Alternatively, the guide rails 18, 20 may also be mounted to the stationary window 14 by using other appropriate methods.

A shoe 28 is slidably mounted within the bottom guide rail 20. The shoe includes a top flange 30 or other structure to which the movable window 16 is mounted. The shoe 28 and the movable window 16 slide integrally within the bottom guide rail 20. A lead screw drive unit 32 is mounted to the stationary window 14 above the bottom edge 26. As further explained below, the lead screw drive unit 32 moves the shoe 28 and the movable window 16 along the guide rail 20.

Figure 2A:
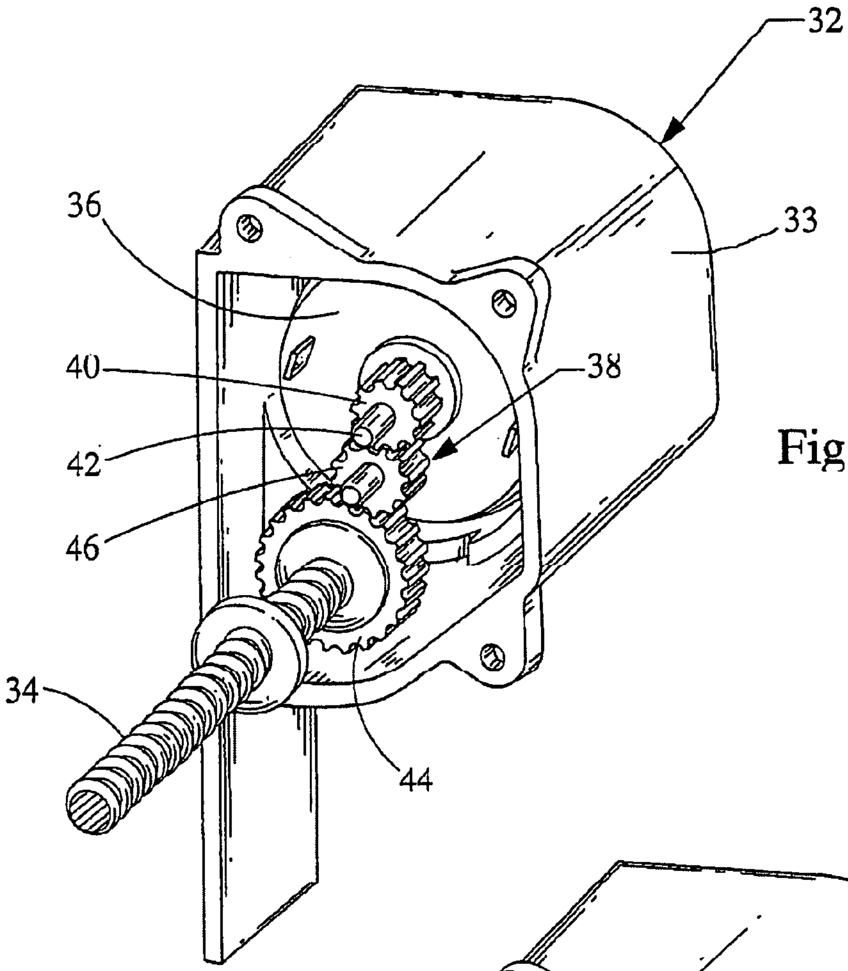
FIGS. 2A, 2B, and 2C, are perspective views of different embodiments of a lead screw drive unit shown in FIG. 1.
Figure 2B:
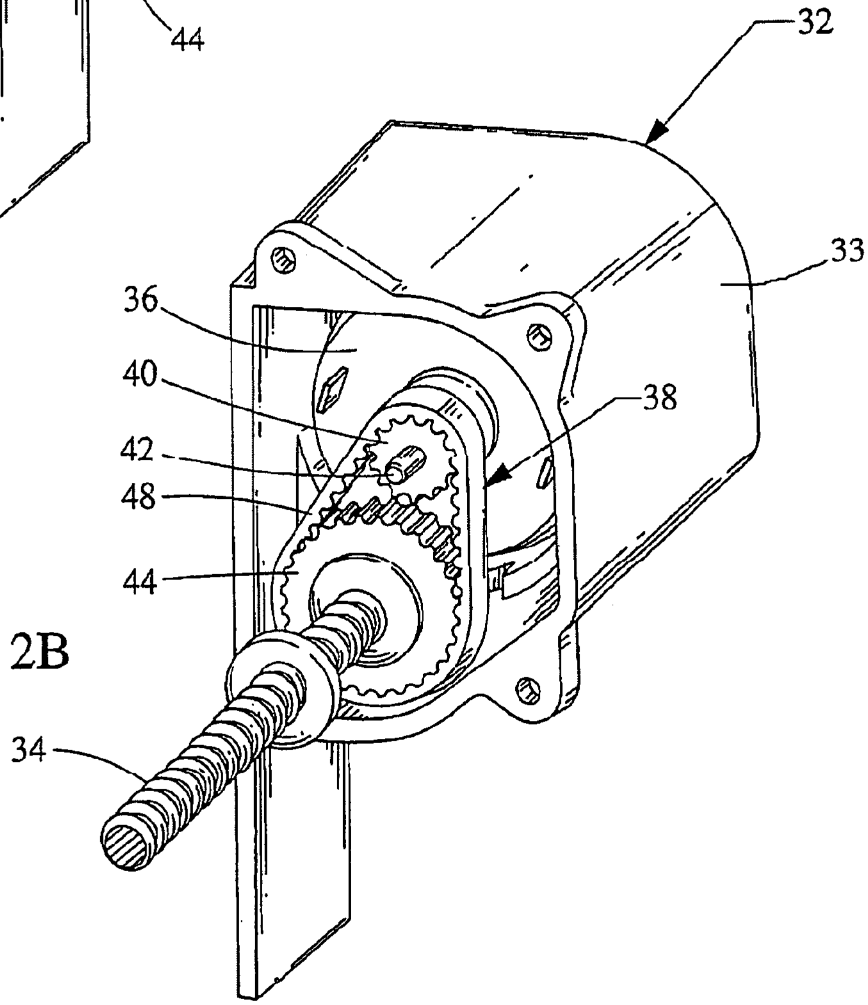
Figure 2C:
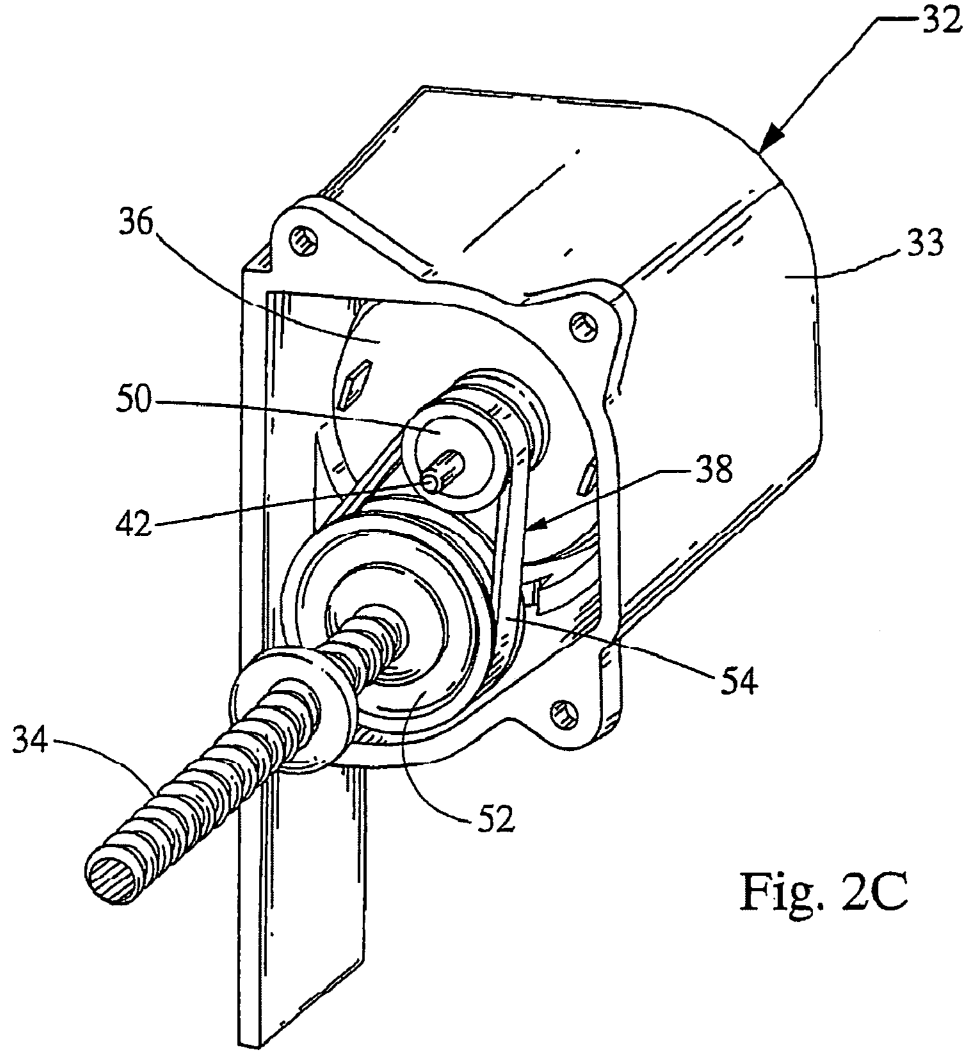
Figure 5:
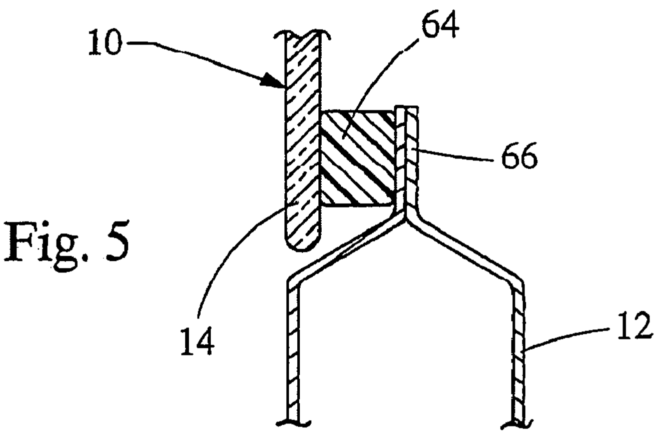
FIG. 5 is a sectional view showing the adhesive placed between the stationary window and the vehicle.

Referring to FIGS. 2A, 2B, and 2C, the lead screw drive unit 32 includes a lead screw 34 that is mounted within and parallel to the bottom guide rail 20. The lead screw unit drive unit 32 includes a housing 33 and a cover 35; and the bottom guide rail 20 attached to the cover 35. FIGS. 2A, 2B, and 2C are shown with the cover 35 removed. A motor 36 is located within the housing 33 and is adapted to rotate the lead screw in either a clockwise or counter-clockwise direction. Preferably, the motor 36 is an electric motor, more specifically, a permanent magnet DC motor.

The lead screw drive unit 32 may also include a reducing unit 38 to change the ratio of the output from the motor 36 to the lead screw 34. The reducing unit 38 can be any suitable device. Referring to FIG. 2A, the reducing unit 38 includes a first gear 40 that is mounted onto an output shaft 42 from the motor 36 and a second gear 44 that is mounted onto the lead screw 34. A third gear 46 is positioned between and engages each of the first and second gears 40, 44. Rotation of the motor 36 and the first gear 40 is transferred to the second gear 44 and the lead screw 34 through the third gear 46. By adjusting the size and number of teeth on the gears 40, 44, 46, the ratio between the output of the motor 36 and the lead screw 34 can be adjusted. Preferably there is a reduction from the motor 36 to the lead screw 34.

Alternatively, the third gear 46 can be removed and a toothed belt 48 can be placed around the first and second gears 40, 44. In this instance, rotation of the motor 36 and the first gear 40 is transferred to the second gear 44 and the lead screw 34 through the belt 48, as shown in FIG. 2B. By adjusting the size and number of teeth on the gears 40, 44, the ratio between the output of the motor 36 and the lead screw 34 can be adjusted.

Referring to FIG. 2C, a first pulley 50 is mounted onto an output shaft 42 from the motor 36 and a second pulley 52 is mounted onto the lead screw 34. A belt 54 is positioned around and engages outer diameters of the first and second pulleys 50, 52. Rotation of the motor 36 and the first pulley 50 is transferred to the second pulley 52 and the lead screw 34 through the belt 54. By adjusting the diameters of the first and second pulleys 50, 52, the ratio between the output of the motor 36 and the lead screw 34 can be adjusted.

Figure 3A:
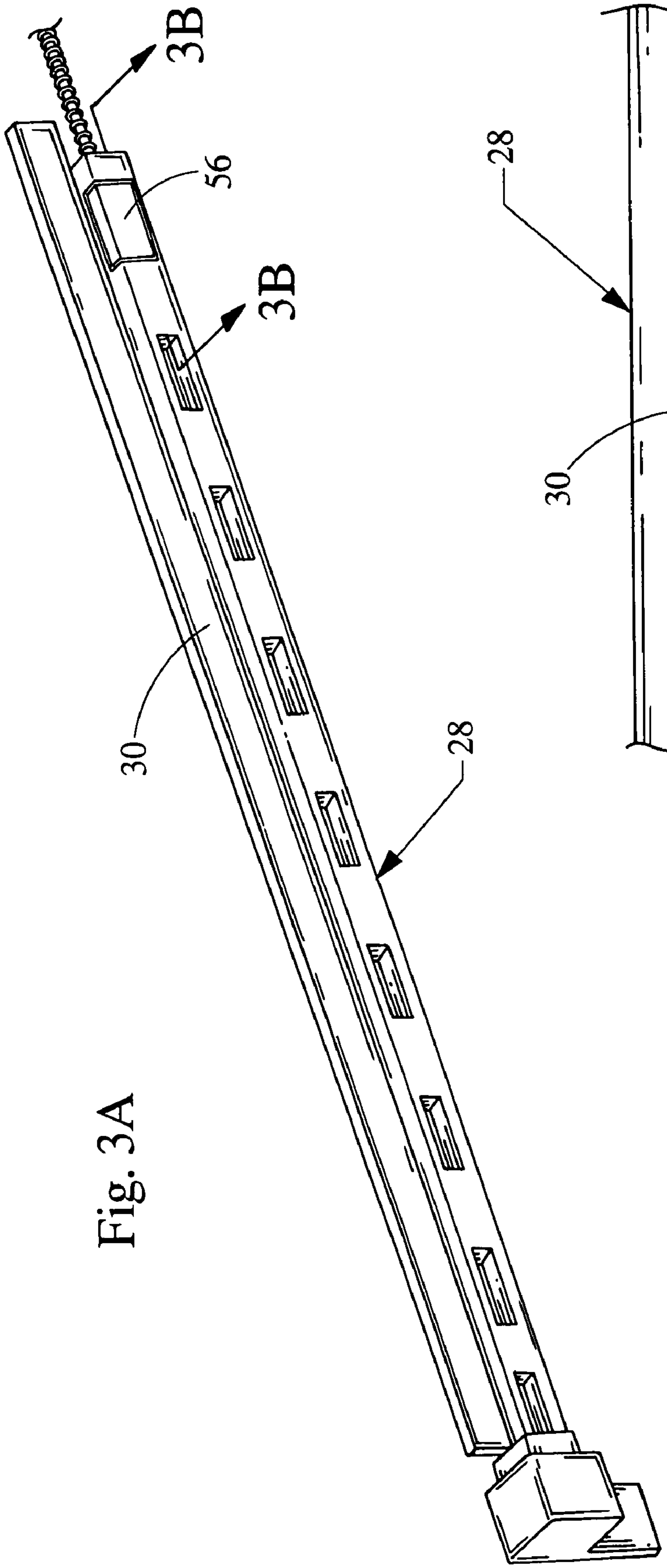
FIG. 3A is a perspective view of a shoe shown without the movable window mounted thereon and the guide rail removed.
Figure 3B:
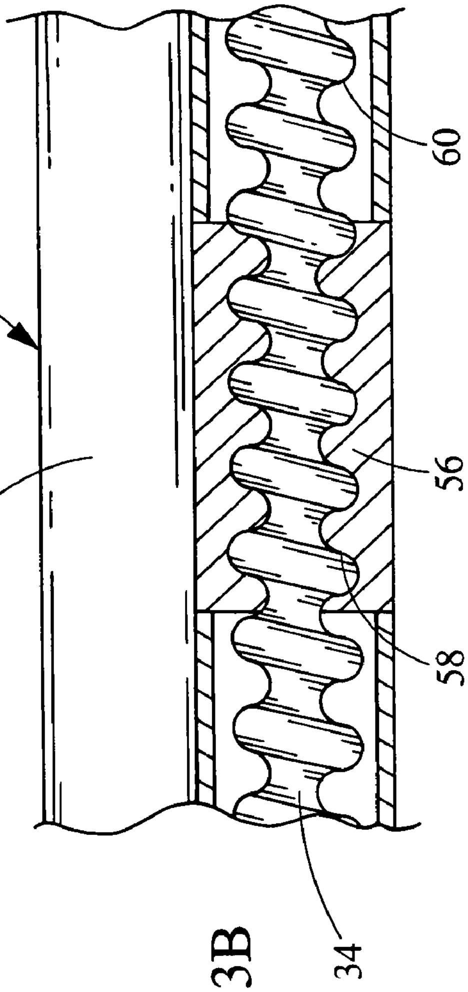
FIG. 3B is a sectional view taken along lines 3B—3B of FIG. 3A.

Referring to FIGS. 3A and 3B, the shoe 28 includes a lead screw follower 56 that engages the lead screw 34. Rotation of the lead screw 34 will cause the lead screw follower 56 to move longitudinally along the lead screw 34, thereby moving the shoe 28 and the movable window 16 within the bottom guide rail 20. Referring to FIG. 3B, the lead screw follower 56 includes an internal thread 58 that corresponds to the external thread 60 of the lead screw 34. The lead screw follower 56 is mounted within the shoe 28, at one end or elsewhere, so the lead screw follower 56 cannot rotate. Therefore, when the lead screw 34 rotates, the threaded engagement between the lead screw 34 and the lead screw follower 56 forces the lead screw follower 56 to move longitudinally along the lead screw 34. This in turn moves the shoe 28 within the bottom guide rail 20 and the moveable window 16 relative to the stationary window 14.

Figure 4:
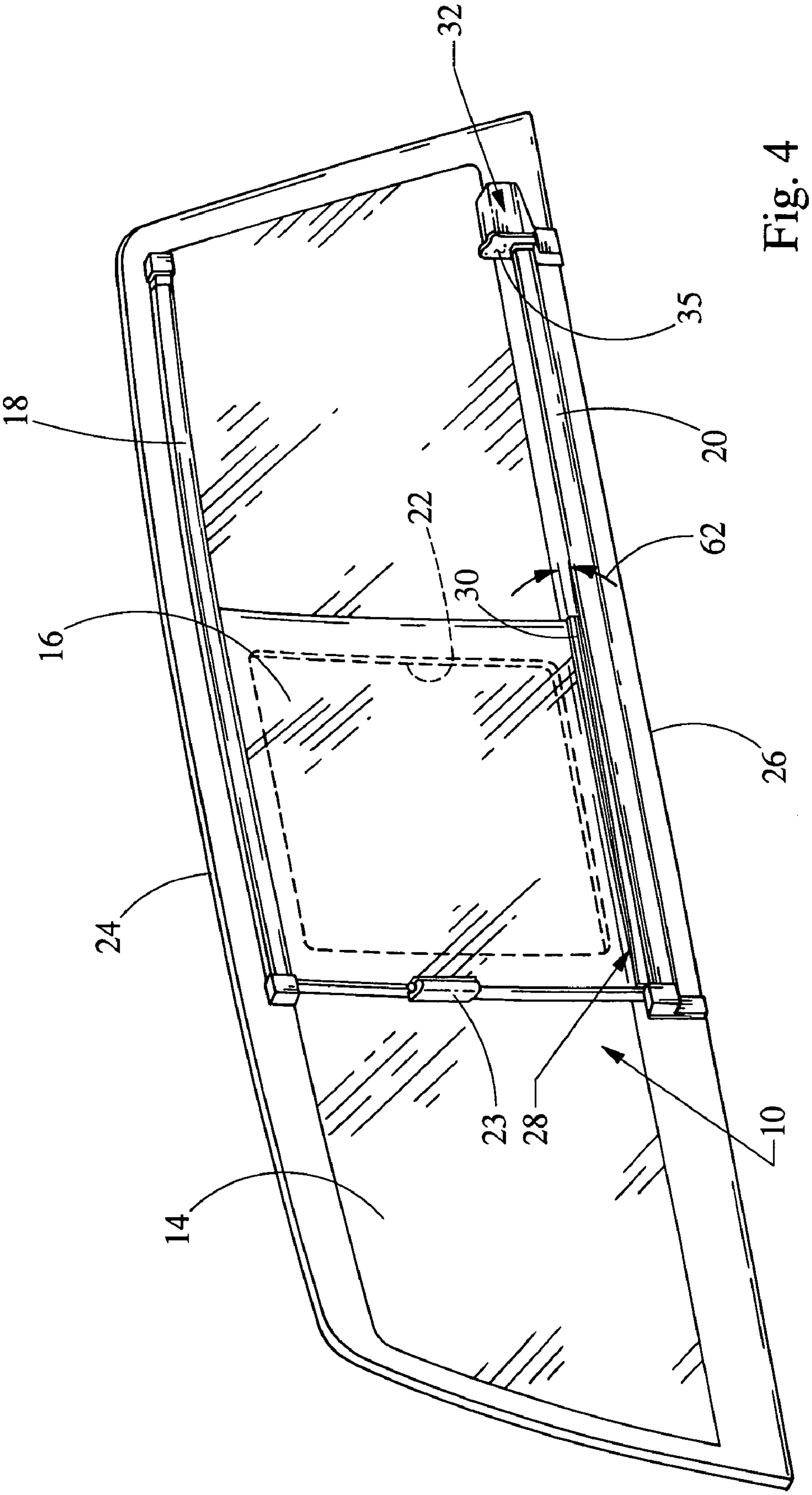
FIG. 4 is a perspective view similar to FIG. 1 wherein the guide rails are mounted to the stationary window at an angle to the bottom edge of the stationary window.

Preferably, the guide rails 18,20 are mounted to the stationary window 14 parallel to the bottom edge 26, as shown in FIG. 1. However, to accommodate for cross car sag, or bending in the glass, the guide rails 18, 20 can be mounted to the stationary window 14 at an angle 62 relative to the lower surface of the stationary window 14 and the movable window 16 is mounted to a wedge shaped shoe 28 at a corresponding angle 62, as shown in FIG. 4. The angles in FIG. 4 are exaggerated for illustrative purposes.

The sliding window assembly 10 is preferably attached to the motor vehicle 12 via a water-tight seal. More specifically, an adhesive layer 64 is located between the stationary window 14 and a window flange 66 of the motor vehicle 12 to form a water-tight seal. The adhesive layer 64 may be any adhesive commonly used for the mounting of windows in vehicles. The adhesive layer 64 is preferably located on the side of the stationary window 14 that faces interiorly of the motor vehicle 12, located along the periphery of the stationary window 14, as shown in FIG. 4. The adhesive layer 64 is also preferably located on the same face of the stationary window 14 as the guide rails 18, 20 such that the guide rails 18, 20 and the movable window 16 are oriented toward the interior of the motor vehicle 12 passenger compartment.

The foregoing disclosure is the best mode devised by the inventors for practicing the invention. Inasmuch as the foregoing disclosure is intended to enable one skilled in the pertinent art to practice the instant invention, it should not be construed to be limited thereby but rather should be construed to include such aforementioned obvious variations and be limited only by the spirit and scope of the following claims.

The invention claimed is:

1. A sliding window panel assembly for a motor vehicle, the sliding panel assembly comprising:

a stationary window panel having an opening formed therein;

at least one guide rail coupled to the stationary window panel below the opening and above a bottom edge of the stationary window panel;

a shoe slidably received within the guide rail and configured to slidably move within the guide rail;

a movable panel mounted onto the shoe such that the movable window panel slidably moves with the shoe, wherein the movable window panel can slidably move with respect to the stationary window panel along a movable panel path; and a lead screw drive unit engaging the shoe adapted to move the shoe and the movable panel along the movable panel path within the guide rail, wherein the lead screw drive unit includes a lead screw positioned within and parallel to the guide rail, a motor coupled to and adapted to rotate the lead screw, and a lead screw follower coupling the shoe to the lead screw such that rotation of the lead screw causes movement of the lead screw follower longitudinally along the lead screw, thereby moving the shoe and the movable window panel within the guide rail.

2. The sliding window panel assembly of claim 1 wherein the lead screw drive unit is mounted to the stationary window panel adjacent to and above the bottom edge of the stationary window panel.

3. The sliding window panel assembly of claim 1 wherein the guide rail is mounted to the stationary window panel parallel to the bottom edge of the stationary window panel.

4. The sliding window panel assembly of claim 1 wherein the guide rail is mounted to the stationary window panel at an angle relative to the bottom edge of the stationary window panel and the movable window panel is mounted onto an appropriately angled shoe for correcting cross car glass sag of the stationary window panel.

5. The sliding window panel assembly of claim 1 further including a reduction unit positioned between the motor and the lead screw.

6. The sliding window panel assembly of claim 5 wherein the reduction unit comprises a first gear mounted onto an output shaft of the motor, a second gear mounted onto the lead screw, and a third gear mounted between and engaging each of the first and second gears such that rotation of the motor and the first gear is transferred to the second gear and the lead screw through the third gear.

7. The sliding window panel assembly of claim 5 wherein the reduction unit comprises a first gear mounted onto an output shaft of the motor, a second gear mounted onto the lead screw, and a belt extending around and engaging each of the first and second gears such that rotation of the motor and the first gear is transferred to the second gear and the lead screw through the belt.

8. The sliding window panel assembly of claim 5 wherein the reduction unit comprises a first pulley mounted onto an output shaft of the motor, a second pulley mounted onto the lead screw, and a belt extending around and engaging each of the first and second pulleys such that rotation of the motor and the first pulley is transferred to the second pulley and the lead screw through the belt.

9. The sliding window panel assembly of claim 1 wherein the motor is a permanent magnet DC motor.

10. The sliding window panel assembly of claim 1, wherein the stationary window panel and the movable window panel are comprised of glass.

11. The sliding window panel assembly of claim 1, wherein the stationary window panel is configured to be connected to the motor vehicle.

12. The sliding window panel assembly of claim 11, wherein an adhesive layer is mounted to the stationary window panel and configured to connect to the motor vehicle.

13. A sliding window panel assembly for a motor vehicle, the sliding window panel assembly comprising:

a stationary window panel having an opening formed therein;

at least one guide rail coupled to the stationary window panel below the opening and above a bottom edge of the stationary window panel;

a shoe slidably received within the guide rail and configured to slidably move within the guide rail;

a movable window panel mounted onto the shoe such that the movable window panel slidably moves with the shoe, wherein the movable window panel can slidably move with respect to the stationary window panel along a movable panel path;

a lead screw positioned within and parallel to the guide rail;

a permanent magnet DC motor coupled to and adapted to rotate the lead screw;

a reduction unit positioned between and interconnecting the motor and the lead screw;

a lead screw follower coupling the shoe to the lead screw such that rotation of the lead screw causes movement of the lead screw follower longitudinally along the lead screw, thereby moving the shoe and the movable panel within the guide rail.

14. The sliding window panel assembly of claim 13 wherein the guide rail is mounted to the stationary window panel parallel to the bottom edge of the stationary window panel.

15. The sliding window panel assembly of claim 13 wherein the guide rail is mounted to the stationary window panel at an angle relative to the bottom edge of the stationary window panel and the movable window panel is mounted onto an appropriately angled shoe for correcting cross car glass sag.

16. The sliding window panel assembly of claim 13 wherein the reduction unit comprises a first gear mounted onto an output shaft of the motor, a second gear mounted onto the lead screw, and a third gear mounted between and engaging each of the first and second gears such that rotation of the motor and the first gear is transferred to the second gear and the lead screw through the third gear.

17. The sliding window panel assembly of claim 13 wherein the reduction unit comprises a first gear mounted onto an output shaft of the motor, a second gear mounted onto the lead screw, and a belt extending around and engaging each of the first and second gears such that rotation of the motor and the first gear is transferred to the second gear and the lead screw through the belt.

18. The sliding window panel assembly of claim 13 wherein the reduction unit comprises a first pulley mounted onto an output shaft of the motor, a second pulley mounted onto the lead screw, and a belt extending around and engaging each of the first and second pulleys such that rotation of the motor and the first pulley is transferred to the second pulley and the lead screw through the belt.

19. The sliding window panel assembly of claim 13, wherein the stationary window panel and the movable window panel are comprised of glass.

20. The sliding window panel assembly of claim 13, wherein the stationary window panel is configured to be connected to the motor vehicle.

21. The sliding window panel assembly of claim 13, wherein an adhesive layer is mounted to the stationary window panel and configured to connect to the motor vehicle.

* * * * *